United States Patent [19]

Hill et al.

[11] Patent Number: 5,332,329

[45] Date of Patent: Jul. 26, 1994

[54] ANTI-TWIST BUSHING

[76] Inventors: Thomas R. Hill, P.O. Box 149, Flippin, Ark. 72634; Danny M. Nelson, Rte. 2, Box 225, Mountain Home, Ark. 72653

[21] Appl. No.: 884,415

[22] Filed: May 14, 1992

[51] Int. Cl.$^5$ .............................................. F16B 9/02
[52] U.S. Cl. ........................... 403/261; 285/354; 285/343; 403/259; 403/299; 403/310; 174/153 G
[58] Field of Search ............... 285/342, 348, 343, 338, 285/196, 325, 354; 403/259, 261, 309, 310, 313, 299; 174/65 R, 151, 152 R, 152 G, 153 R, 153 G; 248/56

[56] References Cited

U.S. PATENT DOCUMENTS

| | | | |
|---|---|---|---|
| 887,877 | 5/1908 | Trumbull | 174/152 G |
| 1,684,826 | 9/1928 | Hill | 285/354 X |
| 1,750,790 | 3/1925 | Bessonett | 285/343 X |
| 2,974,186 | 3/1961 | Klumpp, Jr. | 174/153 G |
| 2,986,409 | 5/1961 | Weber | 285/348 X |
| 3,056,852 | 10/1962 | Sachs | 174/153 G |
| 3,366,356 | 1/1968 | Fisher | 174/153 G X |
| 3,424,853 | 1/1969 | Johnson, III | 174/65 R |
| 4,025,093 | 5/1977 | Leczycki | 285/348 X |
| 4,033,535 | 7/1977 | Moran | 174/153 G X |
| 4,549,038 | 10/1985 | Masheris et al. | 285/343 X |
| 4,900,068 | 2/1990 | Law | 285/249 X |

FOREIGN PATENT DOCUMENTS 180483  3/1936  Switzerland ................ 174/151

*Primary Examiner*—Randolph A. Reese
*Assistant Examiner*—George D. Spisich
*Attorney, Agent, or Firm*—Stephen D. Carver

[57] ABSTRACT

An anti-twist strain relief bushing for use with an exteriorly threaded tubular pipe for nondestructively restraining an electrical cord against axial or torsional displacements. The bushing comprises an interiorly threaded gland nut to be screwed onto the tubular pipe and an insert to be wedged into the pipe by the nut. The gland nut comprises a circular top defining a circular beveled opening, an integral flange spaced apart from the top parallel and concentric with the top, and an internally threaded, tubular body extending from the top to the flange defining a passageway concentric with the beveled opening and the flange. The body has a plurality of radially spaced apart raised ribs longitudinally disposed on its exterior. The underside of the top and the body define an integral, beveled shoulder disposed interiorly within the passageway. The insert comprises two separate, mirror image halves adapted to be folded together when the insert is forced into the pipe. The halves are packaged together by an integral coupling hinge extending between them. The hinge is adapted to guide the halves into proper alignment. The insert comprises a circular collar defining a cord compressive opening adapted to be forcibly contacted by the beveled shoulder and an integral, generally cylindrical, tapered shank extending from the collar. The collar and shank define an interior parallelipiped-shaped cavity for surrounding and compressing the cord.

1 Claim, 2 Drawing Sheets

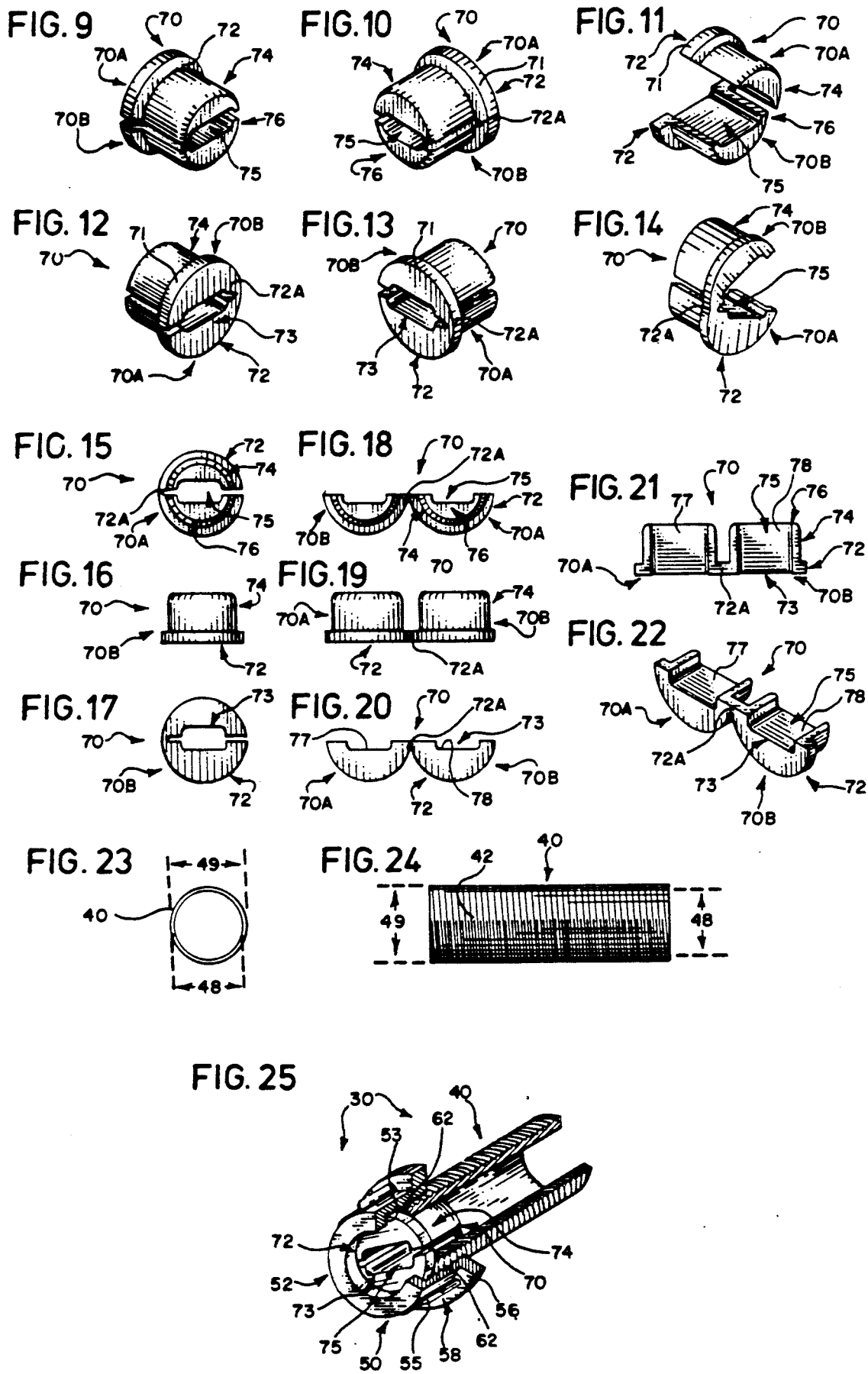

ANTI-TWIST BUSHING

BACKGROUND OF THE INVENTION

The present invention relates generally to molded, plastic strain relief bushings. More particularly the present invention is related to plastic, two-piece, threaded strain relief bushings adapted to resist torsional deflections of the type seen in United States Class 285, Subclasses 161 and 343.

Conventional electric appliances including computers and their components require an electrical cord to pass through the case into the interior of the product. Typical devices generally include an orifice that receives a relief bushing to allow the cord to pass into the product without encountering a sharp edge. Such bushings are generally required by standardized codes. Typical strain relief bushings are used to secure insulated electrical cords against axial and torsional displacements to prevent damage and electrical shorts. In other words, these bushings prevent a tug or pull on the cord from tightening the cord inside the machine and thereby damaging or loosening the connection between the operative components of the product and the cord.

A wide variety of plastic strain relief bushings exist in the prior art. As will be appreciated by those skilled in the assembly of electrical and electronic equipment, a number of yet unsolved problems are encountered with the installation and use of known strain relief bushings.

In the prior art strain relief bushings of the two piece type are common. In many forms of prior art the two pieces are integrally attached to one another by some form of hinge-like strap structure so that both of the cooperating pieces are unitary. In other words, only one unitary piece exits from the mold during the manufacturing process, and only one part need be inventoried by the manufacturer or assembler. The two pieces are then folded together against yieldable tension from the connecting strap to appropriately align and insert the gripping block into the body portion about the electrical cord, for subsequent insertion into the previously established orifice in the work piece. Yet, two-part bushings often fail to provide appreciable structural strength.

U.S. Pat. Nos. 3,298,840 and 3,290,430 exemplify this structure. In these strain relief bushings the strap structure is generally flat, and it angularly extends between two pieces having their axis opposed by at least 90 degrees.

U.S. Pat. No. 4,729,534 is owned by the same assignee as in this case and depicts a unitary two part bushing. The twin parts have similar exteriors but different interiors. One half comprises an internal cavity penetrated by an intruding tongue emanating from the other. These components cooperate to lock a cord between them when the unit is forced into a predefined, non-threaded orifice in a workpiece.

In the prior art all known strain relief bushings of the threaded type comprise a relatively large number of parts that secure a tubular section either by separate nuts or a shoulder on the threaded tube. The element of these bushings that actually contacts the cord, the grommet, is secured within an end of the tube by a separate nut or threaded bushing. In many forms of prior art the grommet is unitary in structure and must be slid over a free end of the cord. This grommet is easily lost during production if it cannot be secured to the rest of the assembly immediately. Furthermore, future repair requires that the entire cord be removed to obtain access to a free end. Many times such procedures are not practical. However threaded bushings known in the prior art provide a relatively rigid and structurally strong means to secure cords in electrical products.

Illustrative of such threaded bushings are U.S. Pat. No. 4,030,742 issued to Eidelberg on Jun. 21, 1977 and, Fidrych U.S. Pat. No. 4,030,741 also issued Jun. 21, 1977. Both these prior art patents disclose a threaded body having an integral nut or shoulder and multiple pieces intended to encompass, shield and secure a cord, cable or conduit.

Many applications requiring electrical cords must have a relatively strong interface at the cabinet of the product. Commonly heavy electrical devices are handled by a cord or a cord is accidentally yanked. Either situation causes much stress to be asserted on the cord where it passes through the device's cabinet.

One major drawback of well-known threaded strain relief bushings is that installation is cumbersome due to the large number of pieces, and is therefore time consuming. This disadvantage also introduces inventory problems. More pieces mean more storage area and more time spent tracking the parts.

Another significant disadvantage of the prior art is its absolute sizing. The threaded housing associated with conventional threaded relief bushings is formed to pass through and secure to a specific size wall or similar structure.

Also, well-known prior art strain relief bushings generally fail under unusual strain. Under tension of continued duration, the two parts of the grommets weaken, become distorted, and eventually pull away from each other and the insulative jacket of the electrical cord and out of locking engagement with the threaded housing.

Numerous prior art patents exist for threaded strain relief bushings employing two or more cooperative, interlocking parts. For example, Nicholson, U.S. Pat. No. 3,843,833, dated Oct. 22, 1974, which includes interior teeth or serrations adapted to grip the jacket of the electrical cord. Law U.S. Pat. No. 4,900,068 discloses a liquid tight connector employing a clip with fingers to grasp conduit. U.S. Pat. No. 4,738,636 issued to Bolante on Apr. 19, 1988 shows structure that grips a cord with tines. Jones teaches in U.S. Pat. No. 4,789,759 an assembly that is secured to a bulkhead having three concentric bores the outer one of which is threaded. Elgin, U.S. Pat. No. 4,549,038 discloses a cord grip employing a tubular housing with a shoulder and the interior of which has a decreasing circumference to compress a grommet around a cord as the grommet is forced deeper into the housing by an exterior that gland nut.

Lundeberg U.S. Pat. No. 4,150,250 shows a stain relief fitting which has a collapsible insert. This insert confines a cord once it is compressed by the device's external cap nut. U.S. Pat. No. 4,375,011 Issued to Grünau Feb. 22, 1983 discloses a bushing employing a screw nut with a conical interior that compresses a bushing around a cord. Michaels, U.S. Pat. No. 4,350,840 discloses a rubber grommet compressed by a nut with a conical interior. Guginsky discloses in U.S. Pat. No. 4,835,342 a strain relief bushing having two interior components and a threaded housing with a decreasing diameter.

It would be desirable to provide a strain relief bushing that securely, nondestructively engages the insulative jacket of the electrical cord when the bushing is installed. Particularly, it would be advantageous to design an anti-twist strain relief grommet that is particularly adapted to non-destructively resist torsional movements. Such an anti-twist bushing must be capable of quick and easy installation, and a minimum of parts should be involved.

SUMMARY OF THE INVENTION

Our invention comprises an anti-twist strain relief bushing system for rapid installation in a suitable dimensioned orifice defined in a conventional workpiece to axially and torsionally restrain a wire. The bushing is ideal for electronic appliances such as personal computer components that require an electrical cord to pass from outside through a case into the interior of the product. Our bushing guides and restrains the power cord, and minimizes damage when severe axial and torsional forces are experienced. In other words, the bushing prevents a tug or pull on the cord from ripping the connection inside the appliance, or from damaging the insulation captivated by the bushing.

Our anti-twist strain relief system comprises a bushing adapted to be installed in a rigid, threaded tube. The bushing preferably comprises twin, cooperating elements that are compressed together during installation. A gland nut is threadably secured to the tube to tightly install an insert that captivates the wire running through it.

The exteriorly threaded tube is secured by a jam nut within the orifice of the workpiece. Alternatively, the workpiece orifice may be internally threaded to receive the pipe.

The gland nut is comprised of a top that defines a circular opening, an integral flange spaced apart from the top and an internally threaded tubular body that defines a passageway. The top, flange and passageway are all concentric. The threads within the body are adapted to be threadably secured to the tube. A plurality of radially spaced apart ribs are disposed on the exterior of the body. These ribs enable the installer to firmly grasp the gland nut to provide sufficient torque to tighten it. The top forms an internal beveled shoulder where its underside mates with the body. When the gland nut is tightened down upon the threaded pipe the shoulder contacts the insert compressing the insert into the pipe.

The insert comprises a collar, a tapered shank projecting from the collar, and an open, terminal end. The collar is generally circular and defines an opening intended to confine and compress the cord. This opening is of a shape and size to accommodate a particular cord configuration.

The shank is slightly tapered to facilitate insertion of the insert into the pipe and further to facilitate removal of the insert from a mold during the manufacturing process. The shank and the end together define a cavity. The opening of the collar and the cavity are similar to allow the cord to pass through the insert. The cavity and the opening constrict around and compresses the cord to hold it in place as the gland nut is tightened and the insert is compressed into the pipe.

Preferably the insert comprises similar halves that are substantially the mirror image of one another. The halves are joined by a small integral hinge. This hinge extends from one semi-circular collar section to the other. Each of the halves defines a rectangular cavity that, when the insert is pinched together for installation, define a generally parallelepiped cavity.

As the gland nut is tightened, the tapered insert compresses about the cord as it is forced into the tubular pipe. The insert is forcibly contacted by the gland nut shoulder, which tends to compress the insert halves. As evident by the above description the bushing will facilitate insulation of the cord from the sharp edge of the pipe or the orifice through which the cord must pass into the workpiece. Due to the inherent strength of the pipe and the integral nature of the insert working in concert with the gland nut, the installed strain relief bushing provides a structurally sound interface between an electrical cord with the housing of a product.

Thus a fundamental object of the present invention is to provide an anti-twist strain relief bushing that firmly secures a power cord, and non-destructively protects against torsional or axial displacements.

Another object is to provide a bushing that can be quickly installed in gripping engagement with the insulating jacket of round or f'at conductors, wires, power cords and the like.

A further broad object of the present invention is to provide a strain relief bushing that non-destructively grips the insulative jacket of an electrical cord when increased tension is applied to the cord.

Yet another broad object of the present invention is to provide a self-locking, bifurcated bushing insert that includes a streamlined, low profile hinge to unite its shank portions.

Another object of the present invention is to provide a two piece strain relief bushing insert characterized by parts that tend to naturally seek operative alignment when the installer folds them together.

A still further object of the present invention is to provide two piece strain relief bushings of the character described that can be conveniently installed in a suitable work piece with a simple, repetitive motion.

A more fundamental object of the present invention is to provide strain relief bushing insert that comprises a pair of cooperative, geometrically opposed halves hingeably connected together by structure that urges the pieces together into operational position when the installer first incrementally "folds" the bushing insert prior to installation.

Another fundamental object of the present invention is to provide a strain relief bushing of an extremely ergonometric quality readily adapted for quick and easy manual installation in the assembly line process.

A related object is to provide a strain relief bushing of the character described that may be readily installed or manipulated by either hand of the installer, thus facilitating installation by either left-handed or right-handed assemblers.

A similar object is to provide a reliable, non-destructive two piece strain relief bushing of the character described which, once installed, is substantially impervious to axial or torsional displacement.

Yet another object of the present invention is to provide a two piece strain relief bushing of the character described, the structure of which cooperates in the aiming and positioning of the bushing insert during insertion into the threaded pipe.

It is also an object of the present invention to provide a reliable two piece strain relief bushing that avoids unnecessary and cumbersome protuberances such as the elongated coupling straps that have been characteristic of prior art strain relief devices.

Another important object is to provide a bushing of the general character described that may be installed in relatively great quantities by assembly line workers without unnecessarily generating or promoting human fatigue, tendinitis, muscle soreness or the like.

A still further fundamental object of the present invention is to provide versions of the above described strain bushing capable of use with either flat or round wires, cables, conductors, conduits or the like.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 9 is a rear isometric view of the preferred insert;

FIG. 10 is a rear isometric view of the insert taken from the opposite side of FIG. 9;

FIG. 11 is a rear isometric view of the insert showing the inner cavity which mates with the electrical cord, with the halves deflected apart;

FIG. 12 is a front isometric view of the insert;

FIG. 13 is a front isometric view of the insert taken from the opposite side of FIG. 12;

FIG. 14 is a frontal view again illustrating the cavity for the electrical cord, with the halves deflected apart;

FIG. 15 is a rear plan view of insert;

FIG. 16 is a side elevational view of the insert;

FIG. 17 is a front plan view of the insert;

FIG. 18 is rear plan view of the two halves spread apart prior to assembly;

FIG. 19 is a side elevational view of the two halves spread apart prior to assembly;

FIG. 20 is a front plan view of the insert, taken generally from a position at the bottom of FIG. 19;

FIG. 21 is an elevational view of the insert, taken from a position above FIG. 20 and looking down;

FIG. 22 is an isometric view of the insert;

FIG. 23 is a front elevational view of a typical threaded conduit;

FIG. 24 is a side elevational view of the typical threaded conduit; and,

FIG. 25 is a fragmentary, isometric view showing the assembled bushing, with the cord omitted for clarity.

DETAILED DESCRIPTION

Figure 1:
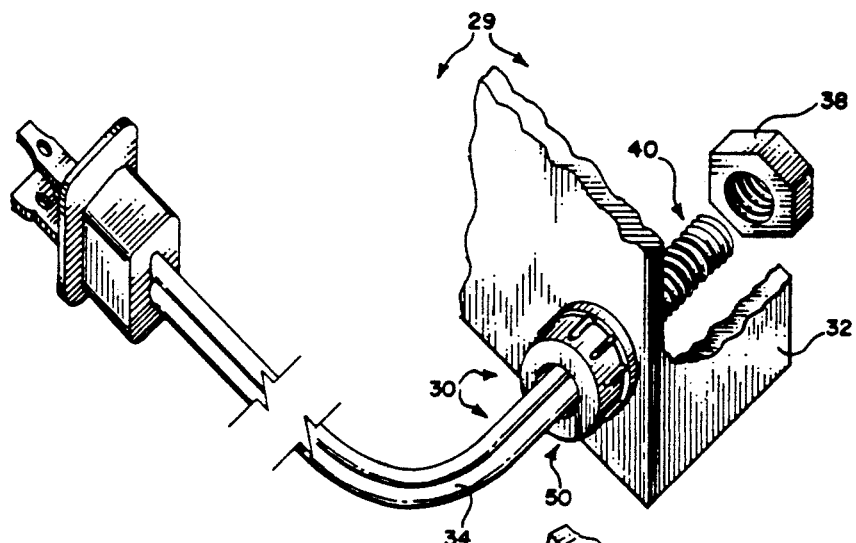
FIG. 1 is a fragmentary, frontal isometric view illustrating an assembled Anti-Twist Bushing constructed in accordance with the best mode teachings of the invention.
Figure 2:
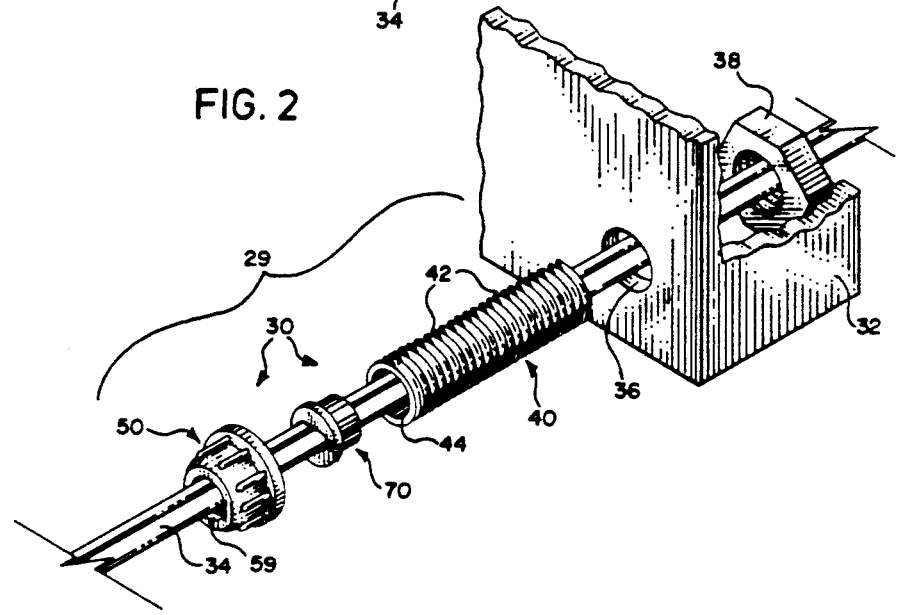
FIG. 2 is a partially exploded, fragmentary isometric view further illustrating the preferred assembly.
Figure 3:
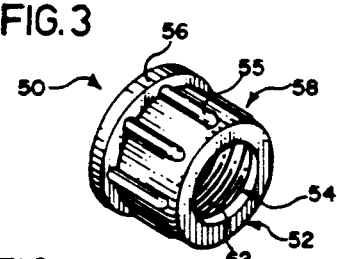
FIG. 3 is a frontal isometric view of the gland nut.
Figure 4:
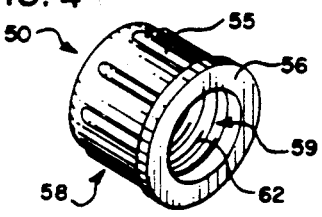
FIG. 4 is a rear isometric view of the gland nut of FIG. 3.
Figure 5:
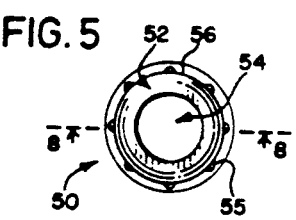
FIG. 5 is a front plan view of the gland nut of FIGS. 3 and 4.
Figure 7:
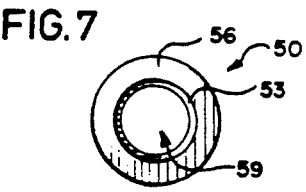
FIG. 7 is rear plan view of the gland nut of FIGS. 3-7.
Figure 6:
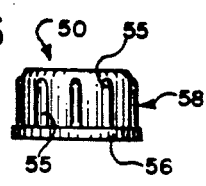
FIG. 6 is a side elevational view of the gland nut of FIGS. 3-5.
Figure 8:
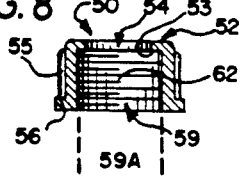
FIG. 8 is a cross-sectional view taken generally along line 8—8 of FIG. 5.

With initial reference now directed to FIGS. 1 and 2 of the appended drawings, a threaded tubular relief bushing system of the present invention has been generally indicated by the reference numeral 29. System 29 comprises a two-piece anti-twist bushing 30 adapted to be employed with a tubular, threaded pipe 40. Pipe 40 is installed in a suitably dimensioned orifice 36 defined in a conventional workpiece 32 to axially and torsionally restrain an elongated cord such as a conventional twin conductor electrical power cord 34. Bushing 30 is ideally adapted for use with "flat" conductors although it may be used to restrain "round" conductors.

In production line assembly, workpieces 32 such as appliances, electronic devices and personal computer components require an electrical cord 34 to pass from outside through a case or chassis into the interior. The chassis of these products generally have an orifice 36 adapted to directly receive some type of relief bushing to allow the cord 34 to pass into the product without encountering a sharp edge. In our invention, the threaded, tubular pipe 40 penetrates the mounting orifice 36, and the bushing is secured to the pipe. Our anti-twist strain relief bushing 30 preferably comprises a gland nut 50 that threadably mates with pipe 40, and an insert 70 that is captivated within the pipe interiorly of the gland nut to restrain the wire.

The exteriorly threaded, tubular pipe 40 is formed of conventional pipe 40 having external threads 42. Pipe 40 passes through orifice 36 and is secured by a jam nut 38. Alternatively, orifice 36 may be interiorly threaded to mate with pipe 40. While pipe 40 can be integrated into the workpiece 32 either by threading it into orifice 36 or securing it with one or more jam nuts 38, the bushing 30 provide the necessary strain relief for the cord 34 and isolates it from the relatively sharp edges 44 of the pipe 40 through which it passes. Insert 70 is secured in an end of the pipe 40 by the gland nut 50. The electrical cord 34 passes through the insert 70, and the insert 70 is the element of the relief bushing 30 that insulates and binds the cord 34 into place.

With additional reference directed now to FIGS. 3-8, gland nut 50 comprises a top 52 that defines a circular opening 54. An integral, terminal flange 56 is spaced apart from the top 52 and forms a base for the gland nut 50. Disposed between the top 52 and the flange 56 is an integral internally threaded, tubular body 58 that defines a passageway 59 through which cord 34 passes. The top 52, flange 56 and passageway 59 are all concentric. The threads 62 within the body 58 are adapted to be mated to threads 42 formed on pipe 40. A plurality of radially spaced apart ribs 55 are disposed on the exterior of the body 58. These ribs 55 enable the installer to firmly grasp the gland nut 50 to provide sufficient torque to tighten the gland nut 50. The underside of top 52 forms an internal, beveled shoulder 53. When the gland nut 50 is tightened down upon the threaded pipe 40, shoulder 53 contacts and compresses insert 70. Therefore, when the gland nut 50 is tightened it compresses the insert 70 into the threaded pipe 40.

With primary reference now directed to FIGS. 9-22, insert 70 comprises a flange-like collar 72 and an integral, tapered shank 74 terminating in an open end 76. Collar 72 is generally circular, and its diameter is greater that the diameter of pipe 40 and slightly less that the interior diameter 59A of gland nut 50. The outer rim-like edges 71 of the collar 72 coaxially contact the inner surface of the gland nut passageway 59 when the bushing is installed. Collar 72 must be smaller than the inner diameter 49 of the pipe 40 so that the threads 62 of the body 58 can pass over the insert 70 to secure bushing 30 to pipe 40.

The collar 72 defines a slot-like opening 73 intended to confine and compress the cord 34. Opening 73 is of a generally parallelepiped shape and size to accommodate a particular cord configuration. Opening 73 depicted in the drawings is intended for use with a conventional flat, two-conductor electrical cord 34. As seen, for example, in FIGS. 15 and 17, opening 73 has a substantially rectangular cross section. Alternatively the opening 73 may be round to accommodate a round cord.

Insert shank 74 is contiguous with the collar 72 and terminates in an open end 76. The shank 74 is slightly tapered to facilitate insertion of the insert 70 into pipe 40 and further to facilitate removal of the insert 70 from a mold during the manufacturing process. The shank 74 and the end 76 together define a cavity 75 that is of a configuration of the appropriate size to accept a cord 34 to be used in a particular application. The opening 73 of the collar 72 and the cavity 75 are similar to allow the cord 34 to pass through the insert 70. The cavity 75 and the opening 73 constricts around and compresses the cord 34 to hold it in place as the gland nut 50 is tightened and the insert 70 is compressed into pipe 40.

The insert 70 preferably comprises twin, cooperating halves 70A and 70B that are mirror images of one another. The halves 70A and 70B are joined by a small integral hinge 72A. This hinge 72A extends from one semi-circular collar 72 section to the other. As mentioned above the shank 74 is contiguous with the collar 72 and terminates in an open end 76. Each of the halves 70A and 70B have faces 77 and 78 which define a rectangular cavity 75 which when the insert 70 is pinched together for installation defines a generally parallelepiped cavity 75.

As the gland nut 50 is tightened, insert 70 is compressed about the cord 34. The collar edges 73 are compressed somewhat within the gland nut during tightening. Also, insert 70 is wedged deeper into pipe 40 as a result of contact between the beveled gland nut shoulder 53 and the collar. As the collar is contacted by the shoulder, its peripheral surfaces 71 are urged together As evident by the above description the bushing 30 will facilitate insulation of the cord 34 from the sharp edges 44 of the pipe 40 or the orifice 36 through which the cord 34 must pass in the workpiece 32. Due to the inherent strength of the tubular pipe 40 and the integral nature of the insert 70 working in concert with the gland nut 50 the installed strain relief bushing 30 provides a structurally sound interface between an electrical cord 34 with the housing of a product.

During installation pipe 40 is secured by a jam nut 38 once it passes through an unthreaded opening 36 in a workpiece 32. The cord 34 can be inserted through the pipe 40 either before or after affixation to workpiece 32. Before cord 34 is passed through pipe 40 the gland nut 50 must be installed. However, due to its bifurcated nature the insert can be "wrapped" around the cord 34 at any time. Therefore, the assembler may move the cord 34 about in the housing until it is properly positioned within the workpiece 32. To finally assemble the bushing 30, the individual need only to pinch the insert 70 around the cord 34 and, while keeping the cord 34 within, slip the insert 70 into the pipe 40 sufficiently far enough to prevent the insert 70 from expanding. The gland nut 50 can then be slipped over the insert 70 into contact with the pipe 40 for tightening. The nut may be manipulated either by hand or wrench, and contact with the raised ribs 55 on nut body 58 eases installation.

As gland nut 50 tightens onto the threaded pipe 40 it contacts the collar 72 of the insert 70 via its shoulder 53. As the insert 70 is pushed in to the threaded pipe 40 it compresses around the cord 34 thereby isolating it from the metal edges 44 of the pipe 40 and any sharp edges of the workpiece orifice 36.

The above disclosed relief bushing 30 thus provides significant structural strength to the interface between the cord 34 and the workpiece 32. Further the cord 34 is insulated from the sharp metal edges of the workpiece 32 by a pipe 40. Further the cord 34 is insulated as it passes through the outer opening of the pipe 40 by an insert 70. The gland nut 50 serves the further function of compressing the insert 70 into the pipe 40 and, since the insert 70 is tapered, pressing the insert 70 around the cord 34 itself.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An anti-twist bushing system for installation within a predefined orifice in a workpiece to nondestructively secure a cord against axial or torsional displacement relative to said orifice, said system comprising:
   an exteriorly threaded tubular pipe adapted to penetrate said orifice and extend from the outside of said workpiece to the inside of said workpiece;
   an interiorly threaded gland nut adapted to be screwed onto said pipe exteriorly of said workpiece, said nut comprising:
   a top defining a beveled opening;
   an integral flange spaced apart from said top and parallel and concentric therewith;
   an integral, internally threaded tubular body extending from said top to said flange defining a passageway concentric with said beveled opening and said flange;
   an underside of said top defining an integral, beveled shoulder spaced apart from said flange and coaxially disposed interiorly within said passageway; and,
   a plurality of radially spaced apart, longitudinally extending raised ribs defined on an exterior of said body;
   an insert adapted to be installed externally of said workpiece, said insert wedged into said pipe by said gland nut when said nut is mated to said pipe, said insert comprising:
   two separate substantially mirror image halves adapted to be folded together before said insert is forced into said pipe;
   a circular collar defining a cored compressive opening, said collar adapted to be forcibly contacted by said beveled shoulder when said gland nut is secured to said pipe;

an integral coupling hinge extending between said halves and of approximately the same width as said collar, said hinge adapted to guide said halves into proper alignment, said hinge being in the form of a slice of a cylinder;

an open end spaced apart from said collar;

an integral, generally cylindrical shank extending from said collar to said end;

a taper adjacent said open end defined on said shank aimed toward said collar adapted to facilitate entry of said insert into said pipe;

an interior parallelepiped-shaped cavity defined within said shank extending between said open end and said collar and bounded by two flat spaced apart faces for surrounding and compressing the entire area of said faces against said cord within said cavity for holding said cord immobile, said cavity comprising a pair of aligned, spaced apart guide slots defined upon opposite internal faces of each half; and, a securing nut screwed on said pipe on an end opposite said gland nut affixing said pipe to said workpiece.

* * * * *